(12) United States Patent
Kohler (10) Patent No.: US 11,776,145 B2
(45) Date of Patent: *Oct. 3, 2023

(54) SYSTEMS AND METHODS FOR RECONSTRUCTING OBJECTS USING TRANSITIONAL IMAGES

(71) Applicant: BNSF Railway Company, Fort Worth, TX (US)

(72) Inventor: Rachel Kohler, Fort Worth, TX (US)

(73) Assignee: BNSF Railway Company, Fort Worth, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/813,767

(22) Filed: Jul. 20, 2022

(65) Prior Publication Data

US 2023/0010706 A1 Jan. 12, 2023

Related U.S. Application Data

(63) Continuation of application No. 16/917,590, filed on Jun. 30, 2020, now Pat. No. 11,423,559.

(51) Int. Cl.
*G06T 7/55* (2017.01)
*G06T 7/12* (2017.01)
*G06T 7/00* (2017.01)

(52) U.S. Cl.
CPC ............. *G06T 7/55* (2017.01); *G06T 7/12* (2017.01); *G06T 7/97* (2017.01); *G06T 2207/30236* (2013.01)

(58) Field of Classification Search
CPC .... G06T 7/55; G06T 7/12; G06T 7/97; G06T 2207/30236
See application file for complete search history.

(56) References Cited

U.S. PATENT DOCUMENTS

2016/0350925 A1* 12/2016 Moon .................. A61B 6/5241
2019/0130189 A1* 5/2019 Zhou .................. G06V 10/7515

FOREIGN PATENT DOCUMENTS

KR 20190063803 A * 6/2019
KR 20190063803 A 6/2019

OTHER PUBLICATIONS

Patent Cooperation Treaty, International Search Report and Written Opinion, International Application No. PCT/US2021/031892, dated Aug. 12, 2021, 15 pages.

(Continued)

*Primary Examiner* — Chan S Park
*Assistant Examiner* — Daniel C Chang
(74) *Attorney, Agent, or Firm* — WHITAKER CHALK SWINDLE & SCHWARTZ PLLC; Enrique Sanchez, Jr.

(57) ABSTRACT

In one embodiment, a method includes receiving, by an object reconstruction module, a first image and a second image. The first image includes a first region of an object and the second image comprises a second region of the object. The method also includes identifying, by the object reconstruction module, a transitional image. The transitional image includes the first region of the object and the second region of the object. The method further includes determining, by the object reconstruction module, that the first region of the object in the transitional image and the first region of the object in the first image are equivalent regions and generating, by the object reconstruction module, a reconstruction of the object using the first image and the transitional image. The reconstruction of the object includes the first region of the object and the second region of the object and excludes equivalent regions.

20 Claims, 4 Drawing Sheets

(56) References Cited

OTHER PUBLICATIONS

Sabato, A., et al., "A novel optical investigation technique for railroad track inspection and assessment," Proceedings of SPIE, vol. 10169, Apr. 19, 2017, 12 pages.
Hermann, C. et al., "Object-centered image stitching," Advances in Databases and Information Systems, retrieved Oct. 7, 2018, pp. 846-861.
Sabato, A. et al., "Feasibility of digital image correlation for railroad tie inspection and ballast support assessment," Measurement, Institute of Measurement and Control London, GB, Feb. 20, 2017, pp. 93-105.
Resendiz, E. et al., "Automated visual inspection of railroad tracks," IEEE Transactions on Intelligent Transportation Systems, vol. 14, No. 2, Jun. 1, 2013, pp. 751-760.
Wang, Z. et al., "Review on image-stitching techniques," Multimedia Systems, vol. 26, No. 4, Mar. 20, 2020, pp. 413-430.
Peleg, S. et al., "Mosaicing on adaptive manifolds," IEEE Transactions on Pattern Analysis and Machine Intelligence, vol. 22, No. 10, Oct. 1, 2000, pp. 1144-1154.

\* cited by examiner

SYSTEMS AND METHODS FOR RECONSTRUCTING OBJECTS USING TRANSITIONAL IMAGES

CROSS-REFERENCE TO RELATED APPLICATIONS

The present application is a Continuation application of U.S. patent application Ser. No. 16/917,590, filed Jun. 30, 2020, the contents of which are incorporated herein in their entireties for all purposes.

TECHNICAL FIELD

This disclosure generally relates to reconstructing objects, and more specifically to systems and methods for reconstructing objects using transitional images.

BACKGROUND

Object detection models process large amounts of image data while also independently inferring on each image. An inherent tradeoff exists between the speed and accuracy of a deep learning model. This tradeoff is amplified when a model is trained to detect objects of dramatically varying size and/or portions of objects with very small percentages of the overall pixel data. While object detection models can be trained to accurately identify an object in multiple images, certain systems cannot afford the latency penalty of accurately detecting very small portions of the object.

SUMMARY

According to an embodiment, a method includes receiving, by an object reconstruction module, a first image and a second image. The first image includes a first region of an object and the second image comprises a second region of the object. The method also includes identifying, by the object reconstruction module, a transitional image. The transitional image includes the first region of the object and the second region of the object. The method further includes determining, by the object reconstruction module, that the first region of the object in the transitional image and the first region of the object in the first image are first equivalent regions and generating, by the object reconstruction module, a reconstruction of the object using the first image and the transitional image. The reconstruction of the object includes the first region of the object and the second region of the object and excludes the first equivalent regions.

In certain embodiments, the first image further includes a third region of the object, a fourth region of the object, and a fifth region of the object, and the transitional image includes the third region of the object and the fourth region of the object. In some embodiments, the method includes determining, by the object reconstruction module, that the third region of the object in the transitional image and the third region of the object in the first image are third equivalent regions and determining, by the object reconstruction module, that the fourth region of the object in the transitional image and the fourth region of the object in the first image are fourth equivalent regions. In certain embodiments, the reconstruction of the object excludes the third and fourth regions. In some embodiments, the method includes concatenating, by the object reconstruction module, the first region of the object, the second region of the object, the third region of the object, the fourth region of the object, and the fifth region of the object to generate the reconstruction of the object, wherein the reconstruction of the object represents the object in its entirety.

In certain embodiments, the method includes identifying, by the object reconstruction module, a first portion of the object in the first image, and constructing, by the object reconstruction module, a first bounding box around the first portion of the object in the first image. The first bounding box may include the first region of the object. In some embodiments, the method includes identifying, by the object reconstruction module, a second portion of the object in the transitional image and constructing, by the object reconstruction module, a second bounding box around the second portion of the object in the transitional image. The second bounding box may include the first region of the object and the second region of the object. In certain embodiments, the method includes using intersection over union (IoU) to determine that the first region of the object in the transitional image and the first region of the object in the first image are equivalent regions. In some embodiments, the transitional image includes half of the first image and half of the second image.

According to another embodiment, an apparatus includes one or more processors and one or more computer-readable non-transitory storage media coupled to the one or more processors. The one or more computer-readable non-transitory storage media include instructions that, when executed by the one or more processors, cause the apparatus to perform operations including receiving a first image and a second image. The first image includes a first region of an object and the second image comprises a second region of the object. The operations also include identifying a transitional image. The transitional image includes the first region of the object and the second region of the object. The operations further include determining that the first region of the object in the transitional image and the first region of the object in the first image are first equivalent regions and generating a reconstruction of the object using the first image and the transitional image. The reconstruction of the object includes the first region of the object and the second region of the object and excludes the first equivalent regions.

According to yet another embodiment, one or more computer-readable storage media embody instructions that, when executed by a processor, cause the processor to perform operations including receiving, by an object reconstruction module, a first image and a second image. The first image includes a first region of an object and the second image comprises a second region of the object. The operations also include identifying, by the object reconstruction module, a transitional image. The transitional image includes the first region of the object and the second region of the object. The operations further include determining, by the object reconstruction module, that the first region of the object in the transitional image and the first region of the object in the first image are first equivalent regions and generating, by the object reconstruction module, a reconstruction of the object using the first image and the transitional image. The reconstruction of the object includes the first region of the object and the second region of the object and excludes the first equivalent regions.

Technical advantages of certain embodiments of this disclosure may include one or more of the following. This disclosure describes systems and methods for reconstructing objects using transitional images. In certain embodiments, the bounding box reduction algorithm used to reconstruct the objects may be used in conjunction with standard, non-maximum suppression algorithms that operate on a per image basis to reduce bounding boxes included within a single image and single inference result. In certain embodiments, a transitional image is generated by overlapping two images by a predetermined percentage. While a predetermined percentage of 50 percent is utilized in certain embodiments of this disclosure, this disclosure contemplates any suitable predetermined percentage (e.g., 25 percent, 75 percent, etc.). In certain embodiments, the systems and methods disclosed herein may use criterion for reduction such as an IoU score between two or more boxes, detection label equivalency, and/or confidence score thresholds.

In certain embodiments of this disclosure, the systems and methods disclosed herein may be used across several object classes in the same images. For example, bounding boxes that belong to the same class may be logically reduced in some embodiments, resulting in several wholly composed objects. In certain embodiments, equivalent regions of bounding boxes and/or other regions of interest may be calculated using IoU similar to the way standard non-maximum suppression algorithms are used to calculate equivalence. The systems and methods described in this disclosure may be generalized to different transportation infrastructures, including railways, roads, and waterways.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Figure 1:
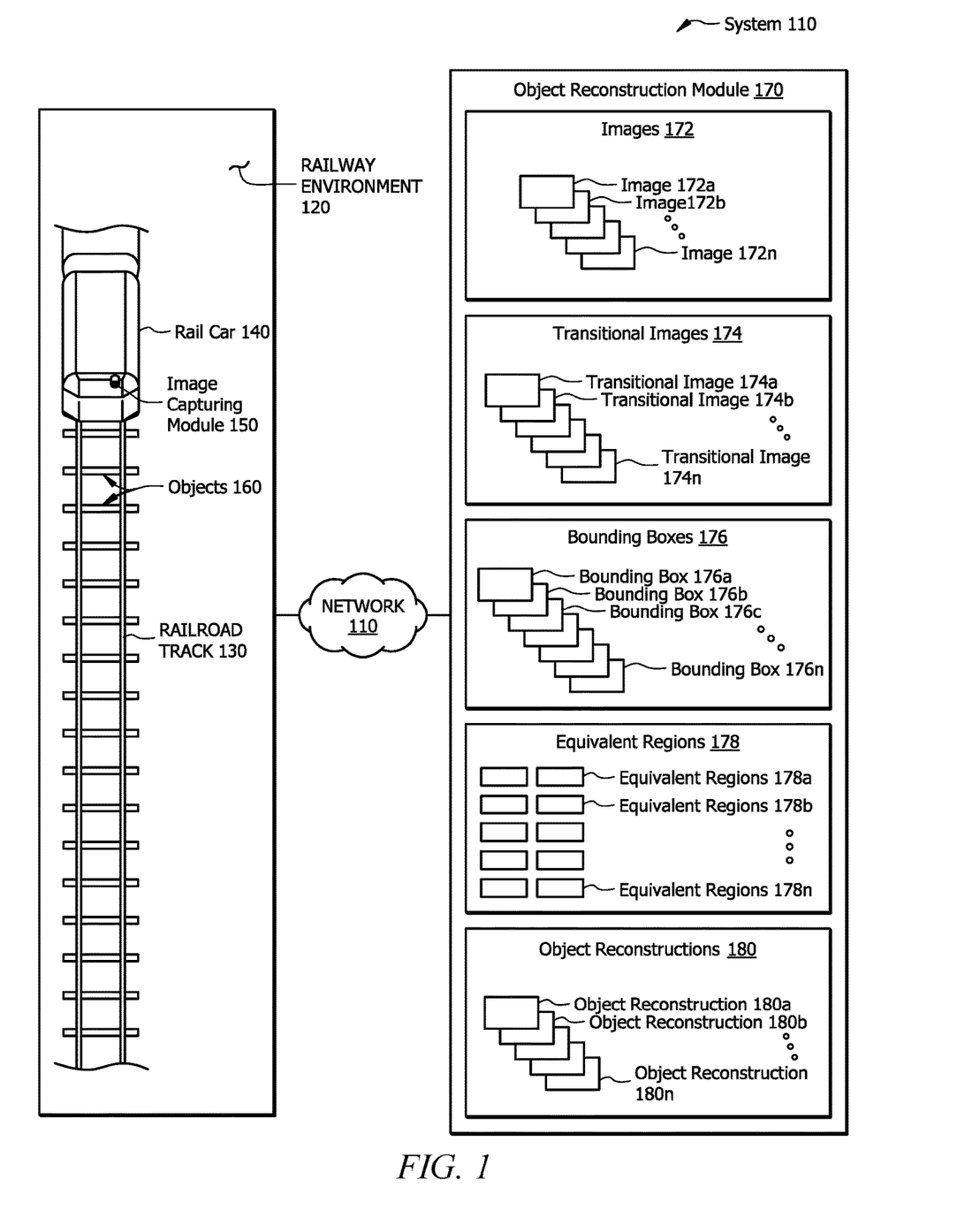
FIG. 1 illustrates an example system for reconstructing objects using transitional images.
Figure 2:
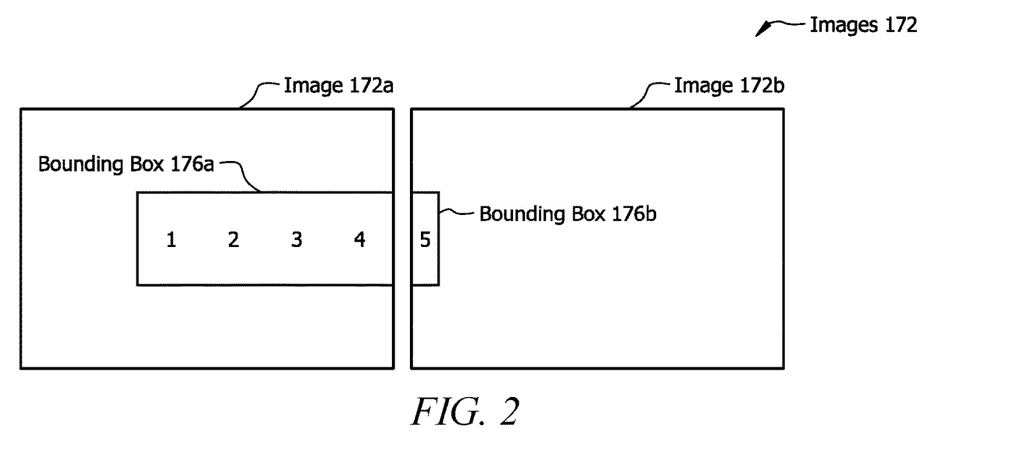
FIG. 2 illustrates example images that may be used by the system of FIG. 1.
Figure 3:
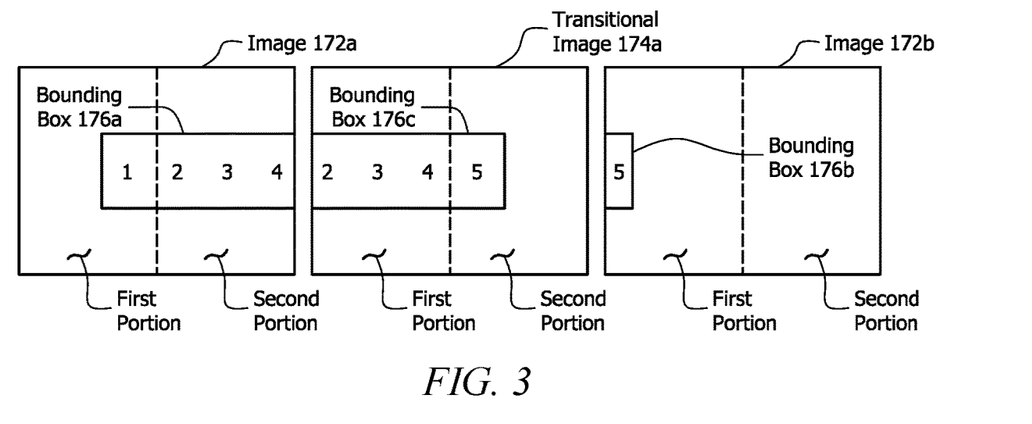
FIG. 3 illustrates an example transitional image that may be utilized by the system of FIG. 1.
Figure 4:
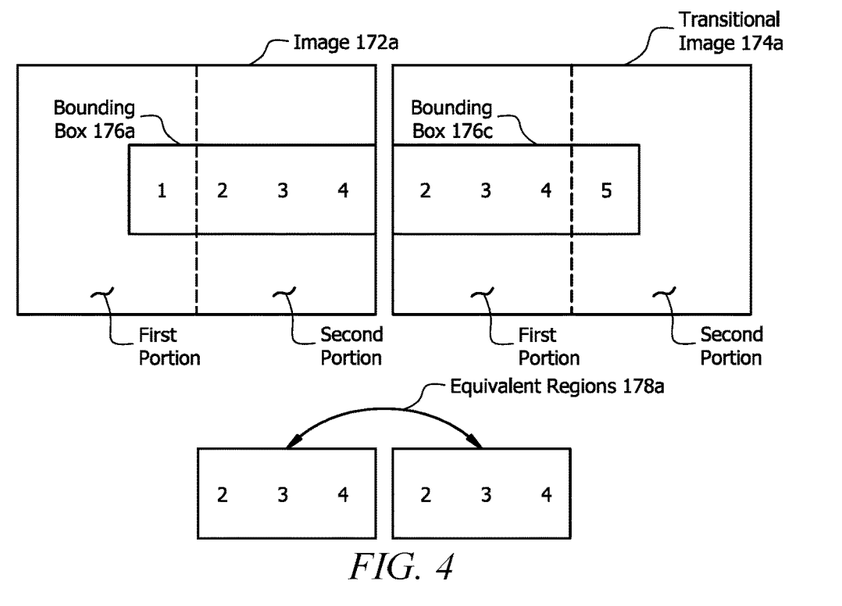
FIG. 4 illustrates example equivalent regions that may be determined by the system of FIG. 1.
Figure 5:
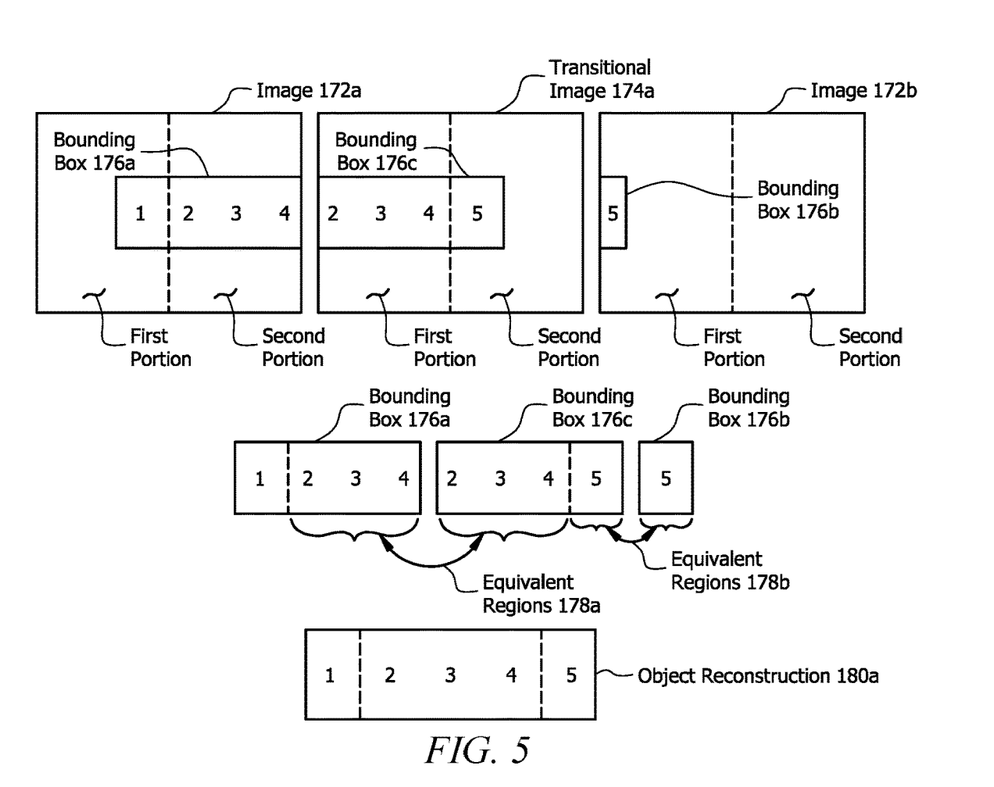
FIG. 5 illustrates an example object reconstruction that may be generated by the system of FIG. 1.
Figure 6:
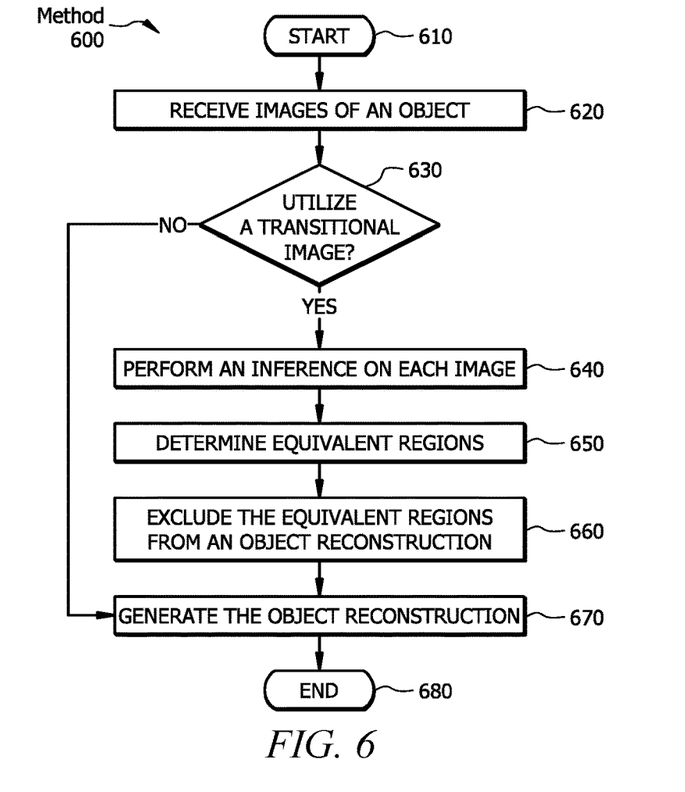
FIG. 6 illustrates an example method for reconstructing an object using a transitional image.
Figure 7:
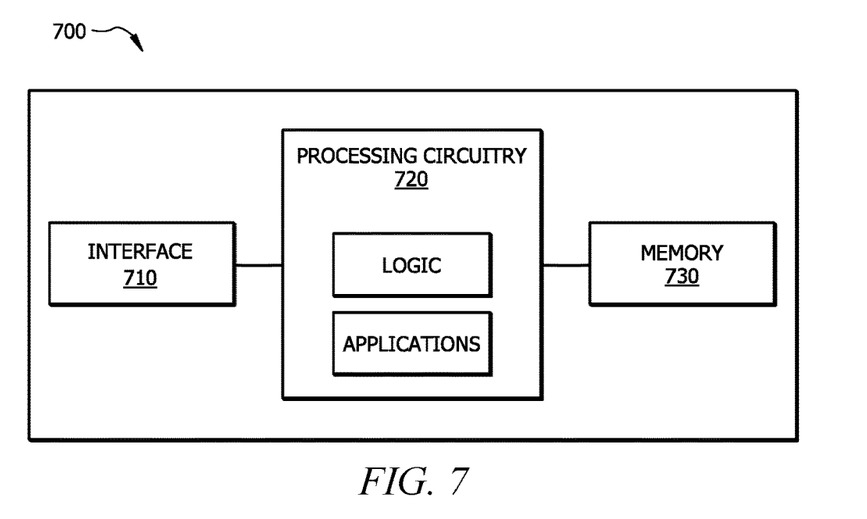
FIG. 7 illustrates an example computer system that may be used by the systems and methods described herein.

FIGS. 1 through 7 show example systems and methods for reconstructing objects using transitional images. FIG. 1 shows an example system for reconstructing objects using transitional images, and FIG. 2 shows example images that may be used by the system of FIG. 1. FIG. 3 shows an example transitional image that may be utilized by the system of FIG. 1, and FIG. 4 shows example equivalent regions that may be determined by the system of FIG. 1. FIG. 5 shows an example object reconstruction that may be generated by the system of FIG. 1. FIG. 6 shows an example method for reconstructing an object using a transitional image. FIG. 7 illustrates an example computer system that may be used by the systems and methods described herein.

FIG. 1 illustrates an example system 100 for reconstructing objects using transitional images. System 100 or portions thereof may be associated with an entity, which may include any entity, such as a business, company (e.g., a railway company, a transportation company, etc.), or a government agency (e.g., a department of transportation, a department of public safety, etc.) that reconstructs objects using transitional images. The elements of system 100 may be implemented using any suitable combination of hardware, firmware, and software. For example, the elements of system 100 may be implemented using one or more components of the computer system of FIG. 7. System 100 includes a network 110, a railway environment 120, a railroad track 130, a rail car 140, an image capturing module 150, objects 160, an object reconstruction module 170, images 172, transitional images 174, bounding boxes 176, equivalent regions 178, and object reconstructions 180.

Network 110 of system 100 is any type of network that facilitates communication between components of system 100. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 110 may include one or more access (e.g., mobile access), core, and/or edge networks. Network 110 may be any communications network, such as a private network, a public network, a connection through Internet, a mobile network, a WI-FI network, a Bluetooth network, etc. One or more components of system 100 may communicate over network 110. For example, object reconstruction module 170 may communicate over network 110, including receiving information from image capturing module 150.

Railway environment 120 of system 100 is an area that includes one or more railroad tracks 130. Railway environment 120 may be associated with a division and/or a subdivision. The division is the portion of the railroad under the supervision of a superintendent. The subdivision is a smaller portion of the division. The subdivision may be a crew district and/or a branch line. In the illustrated embodiment of FIG. 1, railway environment 120 includes railroad track 130, rail car 140, image capturing module 150, and objects 160.

Railroad track 130 of system 100 is a structure that allows rail car 140 to move by providing a surface for the wheels of rail car 140 to roll upon. In certain embodiments, railroad track 130 includes rails, fasteners, railroad ties, ballast, and the like. Rail car 140 of system 100 is a vehicle that can move along railroad track 130. Rail car 140 may be a geometry car, a locomotive, a passenger car, a freight car, a boxcar, a flatcar, a tank car, and the like. In certain embodiments, rail car 140 may be associated with one or more image capturing modules 150.

Image capturing module 150 of system 100 is a component that captures images 172 of objects 160. Objects 160 of system 100 are transportation infrastructure components such as road, railway, airway, waterway, canal, pipeline, and terminal components. Objects 160 may include components within railway environment 120 such as railroad track 130, debris (e.g., rubble, wreckage, ruins, litter, trash, brush, etc.), pedestrians (e.g., trespassers), animals, vegetation, ballast, and the like. Objects 160 may include components of railroad track 130 such as joints, switches, frogs, rail heads, anchors, fasteners, gage plates, ballasts, ties (e.g., concrete ties and wood ties), and the like. Images 172 of system 100 are representations of the physical forms of one or more objects 160. Images 172 may include digital images, photographs, and the like. Images 172 include image 172*a*, image 172*b*, and so on until image 172*n*, where 172*n* represents any suitable number.

Image capturing module 150 may include one or more cameras, lenses, sensors, optics, lighting elements, and the like. For example, image capturing module 150 may include one or more cameras (e.g., a high-resolution camera, a line scan camera, a stereo camera, etc.) that automatically capture images 172 of objects 160. In certain embodiments, image capturing module 150 is attached to rail car 140. Image capturing module 150 may be attached to rail car 140 in any suitable location that provides a clear view of railway environment 120. For example, image capturing module 150 may be attached to a front end (e.g., front bumper) of rail car 140 to provide a downward-facing view of railroad track 130. As another example, image capturing module 150 may be attached to a front end (e.g., front windshield) of rail car 140 to provide a forward-facing view of railroad track 130. As still another example, image capturing module 150 may be attached to a back end (e.g., a back windshield) of rail car 140 to provide a rear-facing view of railroad track 130.

Image capturing module 150 may automatically capture still or moving images 172 while rail car 140 is moving along railroad track 130. Image capturing module 150 may automatically capture any suitable number of still or moving images 172. For example, image capturing module 150 may automatically capture images 172 as a function of distance by using an encoder (e.g., a position encoder) to trigger a camera (e.g., a line scan camera). As another example, image capturing module 150 may automatically capture a predetermined number of still images 172 per second, per minute, per hour, etc. In some embodiments, image capturing module 150 may inspect images 172 for objects 160. For example, image capturing module 150 may use one or more models to detect objects 160 in images 172. The models may include one or more object detection models, machine learning models, machine vision models, deep learning models, and the like. Image capturing module 150 may communicate one or more images 172 of one or more objects 160 to object reconstruction module 170.

Object reconstruction module 170 of system 100 is a component that recreates objects 160 from one or more images 172 and/or one or more transitional images 174. In certain embodiments, object reconstruction module 170 receives images 172 from one or more components of system 100. For example, object reconstruction module 170 may receive image 172*a* and image 172*b* from image capturing module 150. Multiple images 172 may include one or more portions of a single object 160. For example, image 172*a* may include a first portion of object 160, and image 172*b* may include a second portion of object 160. Each object 160 may be represented as regions. For example, object 160 (e.g., a rail joint bar) may have five regions such that image 172*a* includes four consecutive regions of object 160, and image 172*b* includes the remaining fifth region of object 160. As another example, object 160 may have five regions such that image 172*a* includes three consecutive regions of object 160, and image 172*b* includes the remaining fourth region and fifth region of object 160.

In certain embodiments, object reconstruction module 170 performs an inference on one or more images 172 and/or transitional images 174. Object reconstruction module 170 may perform the inference by running an object detection algorithm to detect objects 160 within images 172 and/or transitional images 174. In response to performing the inference(s), object reconstruction module 170 may generate one or more bounding boxes 176 around one or more objects 160 (or portions thereof). Bounding boxes 176 are outlines that identify objects 160. In certain embodiments, each bounding box 176 is a rectangular box around object 160 with x and y coordinates identifying the four corners of the rectangle. Bounding boxes 176 include bounding box 176*a*, bounding box 176*b*, bounding box 176*c*, and so on until bounding box 176*n*, where 174*n* represents any suitable number.

In certain embodiments, image capturing module 150 constructs bounding boxes 176 around objects 160 (or portions thereof) in image 172. For example, object reconstruction module 170 may identify a first portion of object 160 in image 172*a* and construct bounding box 176*a* around the first portion of object 160 in image 172*a*. As another example, object reconstruction module 170 may identify a second portion of object 160 in image 172*b* and construct bounding box 176*b* around the second portion of object 160 in image 172*b*. As still another example, object reconstruction module 170 may identify a third portion of object 160 in transitional image 174*a* and construct bounding box 176*c* around the third portion of object 160 in transition image 176*a*.

In some embodiments, the regions of objects 160 are defined by bounding boxes 176. For example, for an object with five regions: the first portion of object 160 enclosed by bounding box 176*a* in image 172*a* may define a first region, a second region, a third region, and a fourth region of object 160; the second portion of object 160 enclosed by bounding box 176*b* in image 172*b* may define a fifth region of object 160; and the third portion of object 160 enclosed by bounding box 176*c* in transitional image 174*a* may define the second region, the third region, the fourth region, and the fifth region of object 160.

In certain embodiments, object reconstruction module 170 generates transitional images 174 from images 172. Transitional images 174 are images that share the same pixels with one or more other images 172. For example, image 172*a* and transitional image 174*a* may share a predetermined percentage (e.g., 25, 50, or 75 percent) of the same pixels. Transitional images 174 include transitional image 174*a*, transitional image 174*b*, and so on until transitional image 174*n*, where 176*n* represents any suitable number.

In some embodiments, object reconstruction module 170 generates transitional images 174 by overlapping two or more images 172. For example, object reconstruction module 170 may overlap a portion (e.g., 50 percent) of image 172*a* and a portion (e.g., 50 percent) of image 172*b* to generate transitional image 174*a* such that transitional image 174*a* includes the overlapped portions of image 172*a* and image 172*b*. In some embodiments, image capturing module 150 captures transitional images 174. For example, image capturing module 150 may be configured to capture subsequent images 172 that include a predetermined amount of overlap (e.g., a 25, 50, or 75 percent overlap).

In certain embodiments, each transitional image 174 includes one or more regions of object 160. For example, for an object with five regions: image 172*a* may include the first region, the second region, the third region, and the fourth region; image 172*b* may include the fifth region; and transitional image 174*a* may include the second, third, and fourth regions from image 172*a* and the fifth region from image 172*b*.

In certain embodiments, object reconstruction module 170 determines one or more equivalent regions 178. Equivalent regions 178 are regions within images 172 and transitional images 174 that share the same pixels. Equivalent regions 178 include equivalent regions 178a, equivalent regions 178b, and so on until equivalent regions 178n, where 178n represents any suitable number. Object reconstruction module 170 may determine equivalent regions 178 between one or more images 172 and one or more transitional images 174. For example, object reconstruction module 170 may determine that image 172a and transitional image 174a both include the second, third, and fourth regions of object 160. In certain embodiments, object reconstruction module 170 excludes equivalent regions 178 from object reconstructions 180. In some embodiments, object reconstruction module 170 uses IoU, detection label equivalency, and/or confidence score thresholds to determine that the first region of object 160 in transitional image 174 and the first region of object 160 in image 172a are equivalent regions 178.

In certain embodiments, object reconstruction module 170 generates object reconstructions 180. Each object reconstruction 180 is a representation of object 160 in its entirety. For example, object reconstruction 180 may include the first, second, third, and fourth regions of image 172a and the fifth region of image 172b. Object reconstructions 180 include object reconstruction 180a, object reconstruction 180b, and so on until object reconstruction 180n, where 180n represents any suitable number. In certain embodiments, object reconstruction module 170 generates object reconstructions 180 using one or more images 172 and one or more transitional images 174. For example, object reconstruction module 170 may generate object reconstruction 180a by concatenating the first, second, third, and fourth regions from image 172a and the fifth region from transitional image 174a. In certain embodiments, object reconstruction module 170 excludes equivalent regions 178 when generating object reconstructions 180 to avoid duplicating regions of objects 160. For example, if image 172a and transitional image 174a both include a second region, a third region, and a fourth region of object 160, object reconstruction module 170 may exclude the second region, the third region, and the fourth region of transitional image 174a to avoid duplicating these regions in object reconstruction 180a.

In operation, image capturing module 150 of system 100 is attached to rail car 140. Image capturing module captures image 172a and image 172b of object 160 while rail car 140 travels along railroad track 130 of railway environment 120. Object reconstruction module 170 of system 100 receives, via network 110, image 172a and image 172b of object 160 (e.g., a rail joint bar) from image capturing module 150. Object reconstruction module 170 uses one or more object detection models to detect a first portion of object 160 in image 172a. Object reconstruction module 170 constructs bounding box 176a around the first portion of object 160 in image 172a. Object 160 is represented as five regions, and the first portion of image 172a enclosed by bounding box 176a includes the first region, the second region, the third region, and the fourth region of object 160. Image 172b includes the second portion, and fifth region, of object 160. However, object reconstruction module 170 may not detect the second portion of object 160 due to the size of the second portion relative to the overall size of image 172b.

Object reconstruction module 170 generates transitional image 174a by overlapping image 172a and image 172b such that transitional image 174a includes half of image 172a and half of image 172b. Object reconstruction module 170 detects a third portion of object 160 in transitional image 174a and constructs bounding box 176c around the third portion of object 160. Bounding box 176c encompasses the second region, the third region, the fourth region, and the fifth region of object 160. Object reconstruction module 170 determines that the second region, the third region, and the fourth region of image 172a and transitional image 174a are equivalent regions 178. Object reconstruction module 170 excludes equivalent regions 178 (e.g., the third region, the fourth region, and the fifth region of transitional image 174a) in object reconstruction 180 to avoid duplication of the regions of object 160. Object reconstruction module 170 generates object reconstruction 180 of object 160 by concatenating the first region, the second region, the third region, and the fourth region of image 172a and the fifth region of transitional image 174a. As such, system 100 may be used to accurately recreate object 160 in its entirety even when a small portion of object 160 is not detected in image 172b.

Although FIG. 1 illustrates a particular arrangement of network 110, railway environment 120, railroad track 130, rail car 140, image capturing module 150, objects 160, object reconstruction module 170, images 172, bounding boxes 176, transitional images 174, equivalent regions 178, and object reconstructions 180, this disclosure contemplates any suitable arrangement of network 110, railway environment 120, railroad track 130, rail car 140, image capturing module 150, objects 160, object reconstruction module 170, images 172, bounding boxes 176, transitional images 174, equivalent regions 178, and object reconstructions 180. For example, image capturing module 150 and object reconstruction module 170 may be combined into a single module.

Although FIG. 1 illustrates a particular number of networks 110, railway environments 120, railroad tracks 130, rail cars 140, image capturing modules 150, objects 160, object reconstruction modules 170, images 172, bounding boxes 176, transitional images 174, equivalent regions 178, and object reconstructions 180, this disclosure contemplates any suitable number of networks 110, railway environments 120, railroad tracks 130, rail cars 140, image capturing modules 150, objects 160, object reconstruction modules 170, images 172, transitional images 174, bounding boxes 176, equivalent regions 178, and object reconstructions 180. For example, system 100 may include multiple railway environments 120, multiple image capturing modules 150, and/or multiple object reconstruction modules 170.

FIG. 2 illustrates example images 172 that may be used by the system of FIG. 1. In the illustrated embodiment of FIG. 2, images 172 include image 172a and image 172b. Image 172a includes a portion of an object (e.g., object 160 of FIG. 1), and image 172b includes the remaining portion of the same object. The portion of the object in image 172a is enclosed by bounding box 176a, and the portion of the object in image 172b is enclosed by bounding box 176b.

To aid in understanding the object in images 172 in its entirety, the object is divided into five regions. The portion of the object in image 172a includes region 1, region 2, region 3, and region 4, and the portion of the object in image 172b includes region 5. When the object is represented as two independent images 172, the reconstruction of the object in its entirety is bounding box 176a (which includes regions 1 through 4) from image 172a followed by bounding box 176b (which includes region 5) from image 172b. The concatenation of bounding box 176a and bounding box 176b generates a complete set of regions 1 through 5.

As illustrated in FIG. 2, image 172b includes one-fifth of the object, which is a relatively small portion of the object.

While the object reconstruction module of FIG. 1 may be trained to accurately detect the relatively small portion of the object in image 172b, this process may significantly slow down the object detection speed. In certain embodiments, the object reconstruction module may not be able to absorb the latency penalty of detecting region 5 in image 172b. However, the object reconstruction module must capture the object in its entirety. To address this issue, the object reconstruction module may utilize transitional images, as described below in FIG. 3, to accurately detect the entire object without incurring the full latency penalty.

FIG. 3 illustrates transitional image 174a that may be utilized by the system of FIG. 1. Image 172a and image 172b are each divided into two portions: a first portion and a second portion. The second portion of image 172a includes region 2, region 3, and region 4 of bounding box 176a, and the first portion of image 172b includes region 5 of bounding box 176b. In certain embodiments, the object reconstruction module may generate transitional image 174a by overlapping the second portion of image 172a with the first portion of image 172b such that transitional image 174a includes the second portion of image 172a and the first portion of image 172b. In some embodiments, transitional image 174a is generated by an image capturing module.

An independent inference is performed on each of image 172a, image 172b, and transitional image 174a of FIG. 3. In response to performing the inferences, bounding box 176a is constructed on image 172a, bounding box 176b is constructed on image 172b, and bounding box 176c is constructed on transitional image 174a. Image 172a includes regions 1, 2, 3, and 4, image 172b includes region 5, and transitional image 174a includes regions 2, 3, 4 and 5.

Due to the existence of transitional image 174a, an object reconstruction module that sacrifices accuracy for speed can accurately detect the object of image 172a and image 172b in its entirety. Even if the object reconstruction module is unable to detect region 5 of the object in image 172b, the pixels that were originally included in image 172b are also included in transitional image 174a. Thus, the detection of the object in image 172a and transitional image 174a is a complete detection. While inferring on an additional image (e.g., transitional image 174a) incurs a latency penalty, in certain embodiments, this latency penalty may be less than the latency penalty resulting from accurately detecting region 5 of the object in image 172b. FIGS. 4 and 5 below describe additional processing that is applied to the images to avoid duplication of regions 1 through 5.

FIG. 4 illustrates example equivalent regions 178a that may be determined by the system of FIG. 1. Image 172a includes bounding box 176a (which encompasses region 1, region 2, region 3, and region 4 of the object), and image 172b includes bounding box 176b (which encompasses region 5 of the object). In certain embodiments, each region may be encompassed by its own bounding box 176. For example, region 1 of image 172a may be encompassed by a first bounding box 176, region 2 of image 172a may be encompassed by a second bounding box 176, and so on. In certain embodiments, bounding boxes may be nested inside each other. For example, if two different objects which overlap are detected, region 1 may be encompassed by a first bounding box 176, which may be nested within a larger bounding box 176.

As illustrated in FIG. 4, bounding box 176a of image 172a and bounding box 176c of transitional image 174a are not equivalent. Bounding box 176a and bounding box 176c occupy different coordinate space and include different regions of the object. However, the pixels included in the second portion of image 172a are the same pixels that are included in the first portion of transitional image 174a. A simple concatenation of bounding box 176a of image 172a and bounding box 176c of transitional image 174a generates regions 12342345, which is an inaccurate duplication of regions 2, 3, and 4 across the object.

To accurately reconstruct the object in its entirety without duplicating regions of the object, image 172a and/or transitional image 174a are reduced to account for the overlapping pixels. In certain embodiments, the object reconstruction module of FIG. 1 determines equivalent regions 178a within image 172a and transitional image 174a. Equivalent regions 178a are regions within two or more images that share the same pixels. Object reconstruction module 170 may use IoU, detection label equivalency, and/or confidence score thresholds to determine equivalent regions 178a. For example, object reconstruction module 170 may use IoU to determine that bounding boxes 176 encompassing region 2, region 3, and region 4 of image 172a and region 2, region 3, and region 4 of transitional image 174a are equivalent regions 178a. In certain embodiments, the object reconstruction module calculates the IoU of detections in image 172a and transitional image 174a and determines whether the IoU is greater than a predetermined threshold. If the IoU is greater than the predetermined threshold, object reconstruction module 170 determines that the overlap between image 172a and transitional image 174a defines equivalent regions 178a. Equivalent regions 178a may be excluded from the final object reconstruction, as described in FIG. 5 below.

FIG. 5 illustrates an example object reconstruction 180a that may be generated by the system of FIG. 1. As illustrated in FIG. 4 above, regions 2, 3, and 4 of image 172a and transitional image 174a are equivalent regions 178a. Equivalent regions 178a are excluded from object reconstruction 180a (i.e., regions 2, 3, and 4 are only included once in object reconstruction 180a) to avoid duplication of these regions. The object reconstruction module of FIG. 1 generates object reconstruction 180a by concatenating regions 1, 2, 3, 4, and 5. The concatenation of regions 1 through 5 may be represented as 12345 such that object reconstruction 180a represents the object (e.g., object 160 of FIG. 1) in its entirety. In the event that region 5 of the object is detected in image 172b by the object reconstruction module, the same process may be applied to avoid duplication of equivalent regions 178b.

FIG. 6 illustrates an example method 600 for reconstructing an object using a transitional image (e.g., transitional image 174a of FIG. 1). Method 600 begins at step 610. At step 620, an object reconstruction module (e.g., object reconstruction module 170 of FIG. 1) receives, via a network (e.g., network 110 of FIG. 1), two or more images of an object (e.g., object 160 of FIG. 1). For example, the object reconstruction module may receive a first image (e.g., image 172a of FIG. 1) and a second image (e.g., image 172b of FIG. 1) of the object from an image capturing module (e.g., image capturing module 150 of FIG. 1). The image capturing module may be attached to a rail car (e.g., rail car 140 of FIG. 1). In certain embodiments, the image capturing module captures the images of the objects while the rail car travels along a railroad track (e.g., railroad track 130) of a railway environment (e.g., railway environment 120 of FIG. 1). Method 600 then moves from step 620 to step 630.

At step 630 of method 600, the object reconstruction module determines whether to utilize a transitional image (e.g., transitional image 174a of FIG. 3) for the object reconstruction. For example, the object reconstruction module may determine to utilize a transitional image if the object reconstruction module preferences object detection speed over object detection accuracy (e.g., detecting relatively small portions of the object in the received images). If the object reconstruction module determines not to utilize a transitional image for the object reconstruction, object reconstruction module advances from step 630 to step 670, where the object reconstruction module generates a reconstruction of the object from the received images. For example, a first image received by the object reconstruction module may include a first region, a second region, and a third region of the object, and a second image received by the object reconstruction module may include a fourth region and a fifth region of the object.

The object reconstruction module may detect the first region, the second region, and the third region of the object in the first image. The object reconstruction module may detect the fourth region and the fifth region of the object in the second image. The object reconstruction module may generate the reconstruction of the object by concatenating the first region, the second region, and the third region detected in the first image with the fourth region and the fifth region detected in the second image such that the object reconstruction represents the object in its entirety. Method 600 then moves from step 670 to step 680, where method 600 ends.

If, at step 630, the object reconstruction module determines to utilize a transitional image for the object reconstruction, the object reconstruction module may create the transitional image by overlapping a first image and a second image such that the transitional image includes the overlapped portions of each image. For example, the first image received by the object reconstruction module may include a first region, a second region, a third region, and a fourth region of the object, and a second image received by the object reconstruction module may include a fifth region of the object. The object reconstruction module may create the transitional image by overlapping the first image and the second image such that the transitional image includes the second region, the third region, the fourth region, and the fifth region of the object. In certain embodiments, the object reconstruction module receives the transitional image from the image capturing module. Method 600 then moves from step 630 to step 640.

At step 640 of method 600, the object reconstruction module performs an inference on each image. For example, the object reconstruction module may perform an inference on the first image, the second image, and the transitional image by running an object detection algorithm to detect objects within the first image, the second image, and the transitional image. In response to performing the inferences and detecting the objects, the object reconstruction module may generate one or more bounding boxes around the detected objects (or portions thereof). Each bounding box may encompass one or more regions of an object. Method 600 then moves from step 640 to step 650.

At step 650 of method 600, the object reconstruction module determines equivalent regions (e.g., equivalent regions 178*a* of FIG. 4) within the received images. The equivalent regions are regions that share the same pixels. In certain embodiments, the object reconstruction module performs an intersection of the bounding boxes and the overlapping area of the first image, the second image, and the transitional image to normalize bounding boxes, which may extend beyond the overlapping area, before calculating the IoU of two or more boxes. In some embodiments, the object reconstruction module uses IoU, detection label equivalency, and/or confidence score thresholds to determine duplicate regions. For example, the object reconstruction module may use IoU, detection label equivalency, and/or confidence score thresholds to determine that the second region, the third region, and the fourth region are duplicated in the first image and in the transitional image. As another example, the object reconstruction module may use IoU, detection label equivalency, and/or confidence score thresholds to determine that the fifth region is duplicated in the second image and in the transitional image. Method 600 then moves from step 650 to step 660.

At step 660 of method 600, the object reconstruction module excludes the equivalent regions from the reconstruction of the object. For example, if the object reconstruction module determines that the second region, the third region, and the fourth region from the first image and the transitional image are equivalent regions, the object reconstruction module may exclude the equivalent regions in the object reconstruction such that the object reconstruction only includes one copy of the second region, the third region, and the fourth region. As another example, if the object reconstruction module determines that the fifth region from the second image and the transitional image are equivalent regions, the object reconstruction module may exclude the equivalent regions in the object reconstruction such that the object reconstruction only includes one copy of the fifth region. Method 600 then moves from step 660 to step 670.

At step 670 of method 600, the object reconstruction module generates the reconstruction of the object (e.g., object reconstruction 180*a* of FIG. 5) from one or more received images and one or more transitional images. For example, a first image received by the object reconstruction module may include a first region, a second region, a third region, and a fourth region of the object, and the transitional image generated in step 630 of method 600 may include the second region, the third region, the fourth region, and the fifth region of the object. The object reconstruction module may generate the reconstruction of the object by concatenating the first region, the second region, the third region, and the fourth region from the first image with the fifth region of the transitional image such that the object reconstruction represents the object in its entirety. Method 600 then moves from step 670 to step 680, where method 600 ends. As such, method 600 may be used to reconstruct an object in its entirety even if certain regions of the object are not detected in the received images.

Modifications, additions, or omissions may be made to method 600 depicted in FIG. 4. Method 600 may include more, fewer, or other steps. For example, method 600 may include utilizing a second transitional image. Steps may be performed in parallel or in any suitable order. While discussed as specific components completing the steps of method 600, any suitable component may perform any step of method 600. For example, one or more steps of method 600 may be performed by an image capturing module.

FIG. 7 illustrates an example computer system that may be used by the systems and methods described herein. For example, one or more components (e.g., image capturing module 150 and/or object reconstruction module 170) of system 100 of FIG. 1 may include one or more interface(s) 710, processing circuitry 720, memory(ies) 730, and/or other suitable element(s). Interface 710 receives input, sends output, processes the input and/or output, and/or performs other suitable operation. Interface 710 may comprise hardware and/or software.

Processing circuitry 720 performs or manages the operations of the component. Processing circuitry 720 may include hardware and/or software. Examples of a processing circuitry include one or more computers, one or more microprocessors, one or more applications, etc. In certain embodiments, processing circuitry 720 executes logic (e.g., instructions) to perform actions (e.g., operations), such as generating output from input. The logic executed by processing circuitry 720 may be encoded in one or more tangible, non-transitory computer readable media (such as memory 730). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 730 (or memory unit) stores information. Memory 730 may comprise one or more non-transitory, tangible, computer-readable, and/or computer-executable storage media. Examples of memory 730 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (1-II-Ms), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
one or more processors; and
one or more computer-readable non-transitory storage media coupled to the one or more processors and comprising instructions that, when executed by the one or more processors, cause the apparatus to perform operations comprising:
identifying a transitional image, via a processor, wherein the transitional image comprises:
a first region of an object in a first image of a transportation infrastructure component, and
a second region of the object in a second image of the transportation infrastructure component;
generating a reconstruction of the object using the transitional image, wherein the reconstruction of the object comprises a first region of the object and the second region of the object;
identifying a first portion of the object in a first image;
constructing a first bounding box around the first portion of the object in the first image, wherein the first bounding box comprises the first region of the object;
identifying a second portion of the object in the transitional image; and
constructing a second bounding box around the second portion of the object in the transitional image, wherein the second bounding box comprises the first region of the object in the transitional image and the second region of the object.

2. The apparatus of claim 1, wherein:
the first image further comprises a third region of the object, a fourth region of the object, and a fifth region of the object; and
the transitional image comprises the third region of the object and the fourth region of the object.

3. The apparatus of claim 2, the operations further comprising:
determining that the third region of the object in the transitional image and the third region of the object in the first image are third equivalent regions; and
determining that the fourth region of the object in the transitional image and the fourth region of the object in the first image are fourth equivalent regions, wherein the reconstruction of the object excludes the third and fourth equivalent regions.

4. The apparatus of claim 2, the operations further comprising concatenating the first region of the object, the second region of the object, the third region of the object, the fourth region of the object, and the fifth region of the object to generate the reconstruction of the object, wherein the reconstruction of the object represents the object in its entirety.

5. The apparatus of claim 1, the operations further comprising using intersection over union (IoU) to determine that the first region of the object in the transitional image and the first region of the object in the first image are the first equivalent regions.

6. The apparatus of claim 1, wherein the one or more processors include an object reconstruction module.

7. The apparatus of claim 1, wherein the transitional image comprises half of the first image and half of the second image.

8. A method, comprising:
identifying a transitional image, via a processor, wherein the transitional image comprises:
a first region of an object in a first image of a transportation infrastructure component, and
a second region of the object in a second image of the transportation infrastructure component;
generating a reconstruction of the object using the transitional image, wherein the reconstruction of the object comprises a first region of the object and the second region of the object;
identifying a first portion of the object in a first image;
constructing a first bounding box around the first portion of the object in the first image, wherein the first bounding box comprises the first region of the object;
identifying a second portion of the object in the transitional image; and
constructing a second bounding box around the second portion of the object in the transitional image, wherein the second bounding box comprises the first region of the object in the transitional image and the second region of the object.

9. The method of claim 8, wherein:
the first image further comprises a third region of the object, a fourth region of the object, and a fifth region of the object; and
the transitional image comprises the third region of the object and the fourth region of the object.

10. The method of claim 9, further comprising:
determining, by an object reconstruction module, that the third region of the object in the transitional image and the third region of the object in the first image are third equivalent regions; and
determining, by the object reconstruction module, that the fourth region of the object in the transitional image and the fourth region of the object in the first image are fourth equivalent regions, wherein the reconstruction of the object excludes the third and fourth equivalent regions.

11. The method of claim 9, further comprising concatenating, by the object reconstruction module, the first region of the object, the second region of the object, the third region of the object, the fourth region of the object, and the fifth region of the object to generate the reconstruction of the object, wherein the reconstruction of the object represents the object in its entirety.

12. The method of claim 8, further comprising using intersection over union (IoU) to determine that the first region of the object in the transitional image and the first region of the object in the first image are the first equivalent regions.

13. The method of claim 8, wherein the processor includes an object reconstruction module.

14. The method of claim 8, wherein the transitional image comprises half of the first image and half of the second image.

15. One or more computer-readable non-transitory storage media embodying instructions that, when executed by a processor, cause the processor to perform operations comprising:
identifying a transitional image, via a processor, wherein the transitional image comprises:
a first region of an object in a first image of a transportation infrastructure component, and
a second region of the object in a second image of the transportation infrastructure component;
generating a reconstruction of the object using the transitional image, wherein the reconstruction of the object comprises a first region of the object and the second region of the object;
identifying a first portion of the object in a first image;
constructing a first bounding box around the first portion of the object in the first image, wherein the first bounding box comprises the first region of the object;
identifying a second portion of the object in the transitional image; and
constructing a second bounding box around the second portion of the object in the transitional image, wherein the second bounding box comprises the first region of the object in the transitional image and the second region of the object.

16. The one or more computer-readable non-transitory storage media of claim 15, wherein:
the first image further comprises a third region of the object, a fourth region of the object, and a fifth region of the object; and
the transitional image comprises the third region of the object and the fourth region of the object.

17. The one or more computer-readable non-transitory storage media of claim 16, the operations further comprising:
determining, by the object reconstruction module, that the third region of the object in the transitional image and the third region of the object in the first image are third equivalent regions; and
determining, by the object reconstruction module, that the fourth region of the object in the transitional image and the fourth region of the object in the first image are fourth equivalent regions, wherein the reconstruction of the object excludes the third and fourth equivalent regions.

18. The one or more computer-readable non-transitory storage media of claim 16, the operations further comprising concatenating, by the object reconstruction module, the first region of the object, the second region of the object, the third region of the object, the fourth region of the object, and the fifth region of the object to generate the reconstruction of the object, wherein the reconstruction of the object represents the object in its entirety.

19. The one or more computer-readable non-transitory storage media of claim 15, the operations further comprising using intersection over union (IoU) to determine that the first region of the object in the transitional image and the first region of the object in the first image are the first equivalent regions.

20. The one or more computer-readable non-transitory storage media of claim 15, wherein the one or more processors include an object reconstruction module.

* * * * *